United States Patent [19]
Renshaw

[11] Patent Number: 6,065,024
[45] Date of Patent: May 16, 2000

[54] EMBEDDED HTML DOCUMENTS DOWNLOADED AND DISPLAYED SIMULTANEOUSLY WITH PRIMARY HTML DOCUMENT

[75] Inventor: David Seager Renshaw, Winchester, United Kingdom

[73] Assignee: International Business Machines Corporation, Armonk, N.Y.

[21] Appl. No.: 08/823,670

[22] Filed: Mar. 24, 1997

[30] Foreign Application Priority Data

Jul. 11, 1996 [GB] United Kingdom .................. 9614570

[51] Int. Cl.[7] .................................................. G06F 17/30
[52] U.S. Cl. ........................................... 707/513; 707/501
[58] Field of Search ........................... 707/501, 513–515, 707/523

[56] References Cited

U.S. PATENT DOCUMENTS

| | | | |
|---|---|---|---|
| 5,416,896 | 5/1995 | Motoyama | 395/145 |
| 5,438,650 | 8/1995 | Motoyama et al. | 395/114 |
| 5,572,643 | 11/1996 | Judson | 395/793 |
| 5,706,502 | 1/1998 | Foley et al. | 707/10 |
| 5,724,514 | 3/1998 | Arias | 709/235 |
| 5,737,619 | 4/1998 | Judson | 395/761 |
| 5,802,530 | 9/1998 | Van Hoff | 707/513 |
| 5,986,654 | 11/1999 | Alexander et al. | 345/349 |
| 5,987,256 | 11/1999 | Wu et al. | 395/707 |

FOREIGN PATENT DOCUMENTS

| | | |
|---|---|---|
| 0661650 | 7/1995 | European Pat. Off. . |
| WO93/03473 | 2/1993 | WIPO . |

OTHER PUBLICATIONS

Doyle et al., Proposing a Standard Web API, Dr. Dobbs Journal, v.21,n.2,p. 18(7), Feb. 1996.

'Client/Server Survival Guide with OS/2' by Robert Orfali and Dan Harkey, published by Van Nostrand Reinhold 1994, ISBN 0–442–01798–7 (Chapter 35).

Bouvier D J: "In the State of HTML" SIGICE Bulletin, vol. 21, No. 2, Oct. 1, 1995, pp. 8–13, XP000585172.

Schlichter J H et al., Foliopub: A Publication Management System: Computer, vol. 1, No. 1, Jan. 1988, pp. 61–69, XP000052069.

"Positioning of Nested or Included Object Presentation Spaces and Object Data" IBM Technical Disclosure Bulletin, vol. 32, No. 9B, Feb. 1, 1990, pp. 320–323, XP000082366.

Gross C: "Les Applications Java Voyagent Par Resteau" Electronique, No. 56, Feb. 1, 1996, pp. 8–9, XP000554834.

Patent Abstracts of Japan, vol. 097, No. 006, Jun. 30, 1997 & JP 09044383A (Ricoh Co LTD) Feb. 14, 1997.

"Scattering and Gathering Data Among Presentation Spaces" IBM Technical Disclosure Bulletin, vol. 32, No. 10B, Mar. 1, 1990, pp. 24–27, XP000097788.

*Primary Examiner*—Joseph H. Feild
*Assistant Examiner*—Robert D Bourque
*Attorney, Agent, or Firm*—Scully, Scott, Murphy & Presser; Jay P. Sbrollini, Esq.

[57] ABSTRACT

The present invention relates to embedded HTML documents and to a method and system for rendering such documents to a visual display unit. The Internet does not currently support embedded documents. The current manner of viewing a plurality of HTML documents is to include a URL within one documents which allows access to a second document. HTML does not provide for the nesting or embedding of HTML documents. Accordingly the present invention provides a system and method for realising embedded HTML documents. The present invention utilises a Java applet which can be launched by a Java enabled browser. The Java applet can parse and render HTML instructions contained within an HTML document to a reserved area of a visual display unit. The Java applet can also launch further applets and therefore allow further nesting or embedding of HTML documents.

16 Claims, 6 Drawing Sheets

| TAG | STYLE | FONT SIZE | FONT |
|---|---|---|---|
| < H 1 > | BOLD | 20 | TIMES ROMAN |
| < H 2 > | PLAIN | 10 | TIMES ROMAN |
| < I > | ITALIC | * | * |
| ⋮ | ⋮ | ⋮ | ⋮ |
|  |  |  |  |

FIG. 5

EMBEDDED HTML DOCUMENTS DOWNLOADED AND DISPLAYED SIMULTANEOUSLY WITH PRIMARY HTML DOCUMENT

TECHNICAL FIELD

The present invention relates to embedded HTML documents and to a system and method for the rendering thereof.

BACKGROUND OF THE INVENTION

The use and importance of the Internet as a means of exchanging information over recent years has increased dramatically. Various businesses are now using the Internet to advertise their products and services. The operation of the Internet and the use of html is well understood within the art and therefore only brief details thereof will be presented here. Further information relating to the Internet and HTML can be found in, for example, "HTML Sourcebook, A complete guide to HTML", by Graham, I. S. (John Wiley and Sons, Inc), "Spinning the web" by Andrew Ford (International Thomson Publishing, London 1995) and "The World Wide web Unleashed" by John December and Neil Randall (SAMS Publishing, Indianapolis 1994). Information accessed via the Internet is typically displayed using a web Browser. The web Browser can interpret the HTML contained within an HTML document or web page. The HTML controls the presentation of output to a visual display unit of the computer running the web Browser as is well known within the art. A web page typically contains so-called hyperlinks to other web pages. Each hyperlink is a Uniform Resource Locator (URL) which is used to access further a web page or HTML document stored on a particular server connected to the Internet. In order to display the other web pages, the user selects the URL corresponding to that web page using a mouse. The associated web page or HTML document is retrieved and forwarded to the user's web Browser for subsequent display in the conventional manner. Selecting a URL from one web page causes the web page identified by that URL to be displayed in place of the currently displayed web page thereby removing the currently viewed web page from view.

A compound document is a document which comprises many component parts. Each component part typically contains and displays data of a particular type. For example, the text of a patent application may be contained within a text component of a document while the accompanying drawings are contained within graphics component of the document. The text and graphics components can manipulate their respective data independently of each other. Furthermore, the underlying code controlling the display or processing of the data associated therewith can be modifed or replaced independently of the other component parts constituting the document. Many environments exist for the development of compound documents. An example of such an environment is the OpenDoc environment available from Component Integration Laboratories (Sunnyvale, Calif., U.S.A.), and described in "The Byte Guide to OpenDoc" by Andrew McBride and Joshua Susser, Osborne/McGraw-Hill, Berkeley Ca, 1996, ISBN 0-07-882118-5. Further information relating to the structure of compound documents can be found in the above reference.

The HTML documents or web pages as described above can be utilised to produce single layer documents which comprise different data types. For example, the <IMG SRC= "filename.gif"> tag can be used to include an image within a rendered HTML document. The image contained in the file "filename.gi" is included by the web browser in the rendered HTML page. The current documents accessible on the Internet can only be viewed as single layer documents comprising text and images. The images within a rendered HTML documents are rendered by the web Browser. HTML does not support nested or multi-layered HTML documents.

SUMMARY OF THE INVENTION

Accordingly, the present invention provides a method for rendering first and second html documents comprising respective first and second sets of html data to a display screen, wherein the first html document has embedded therein the second html document, comprising the steps of:

parsing and rendering the first set of html data to a first area of said screen, reserving a second area of said screen for use in rendering said second set of html data, said second second area being embedded within said first area, and parsing and rendering the second set of html data to said screen within said second area.

The present invention advantageously provides multi-layer or embedded HTML documents and allows such documents to be rendered to the screen of a computer system or other suitable display device.

In the preferred embodiment, said first html document includes a Java applet tag containing a reference to a Java html parsing and rendering applet for parsing and rendering html to the screen, and the step of reserving the second area is responsive to said Java applet tag, and said steps of parsing and rendering said second set of html data are peformed by said Java applet.

This embodiment enables embedded HTML documents to be realised and rendered independently of the nature of the underlying computer system providing that the latter has the capability of supporting Java. Such support could be provided in many instances by way of a Java-capable web Browser such as the HotJava browser available from Sun MicroSystems. Of course, any other network-enabled language could be used instead of Java to provide the parsing and rendering function.

The parsing and rendering of embedded HTML documents may employ the same text format and graphics fonts within both HTML documents, or alternatively they may differ between nested HTML documents. Thus it is preferred that the method further comprises the steps of creating a data structure for storing format data comprising a plurality of characteristics which determine the format of the rendering, said rendering being performed according to current format data, and wherein said steps of parsing and rendering further comprise the steps of:

identifying new format data, storing a copy of said current format data in the data structure, and modifying the current format data according to the new format data.

In the preferred embodiment, when a need to change the current format data to a preceding format is identified, a copy of the preceding format data stored in the data structure may be recovered, and the current format data modified according to the recovered format data.

Preferably the step of modifying comprises the step of changing only selectable ones of said plurality of characteristics of the current format data according to the new format data, thereby retaining selectable characteristics of stored format data. Utilising this approach enables a reduction in processing to be realised. Rather than having to set new format parameters each time a format changes, the previous parameters can be used. For example, if the text merely changes from a plain style to an italicised style, it is desirable that the font size and name remains the same. Therefore, the current characteristics would retain the current font size and name and vary only the font style.

The invention also provides a system for rendering first and second html documents comprising respective first and second sets of html data to a display screen, wherein the first html document has embedded therein the second html document, comprising means for parsing and rendering the first set of html data to a first area of said screen, means for reserving a second area of said screen for use in rendering said second set of html data, said second second area being embedded within said first area, and means for parsing and rendering the second set of html data to said screen within said second area.

BRIEF DESCRIPTION OF THE DRAWINGS

Embodiments of the present invention will now be described, by way of example only, with reference to the accompanying drawings in which.

DETAILED DESCRIPTION

Figure 1:
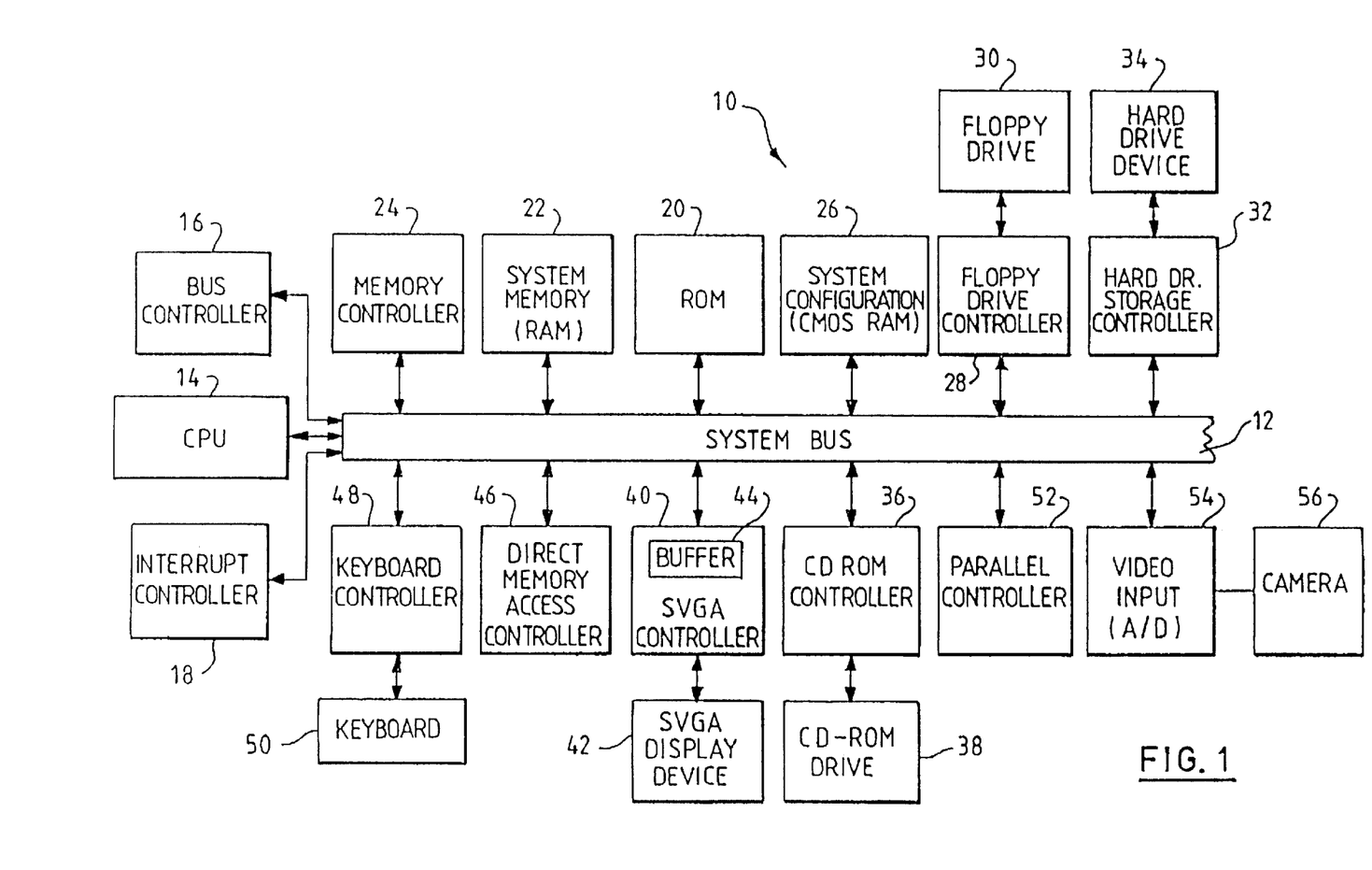
FIG. 1 illustrates a computer system.

Referring to FIG. 1, there is depicted a block diagram of a personal computer system 10, such as an IBM PS/2 personal computer. The computer system 10 includes a 32-bit processor and system bus 12. Connected to system bus 12 is a central processing unit (CPU) 14, for example an Intel Pentium Processor or equivalent microprocessor. CPU 14 passes data to and receives data from other devices attached to system bus 12 over the system bus. Traffic on the bus is controlled by a bus controller 16. An interrupt controller 18 handles interrupts passed between CPU 14 and the remaining devices.

Read only memory (ROM) 20 is non-volatile memory storing power on test processes and a basic input/output system (BIOS or ROM-BIOS). The system memory 22 is random access memory into which an operating system, preferably a 32-bit operating system such as IBM OS/2 WARP which supports concurrent processes or multiple concurrent threads, is loaded for execution to support execution of applications. The computer system has software or applications which provide for the execution of Java. Additional hardware components of computer 10 attached to system bus 12 include a memory controller 24 and a system configuration store 26, provided by random access memory (RAM).

Auxiliary data storage is provided by peripheral controllers and associated storage devices including, a floppy disk or diskette controller 28 and drive 30, a hard drive controller 32 and hard drive device 34, and a compact disk (CD) read only memory (ROM) controller 36 with CD-ROM drive 38. An SVGA controller 40 includes a RAM buffer 44 in which the current frame for display 42 is stored. In some computers, the buffer 44 may be loaded directly from system memory 22 or from an auxiliary storage controller.

Direct memory access (DMA) controller 46 handles data transfers between auxiliary storage devices or other input/output devices, and system memory 22 without interaction by CPU 14. Keyboard controller 48 provides an interface to a keyboard 50, for user entries, and may be used to provide an interface to a "mouse". Parallel controller 52 is a device controller for an input or output device (e.g. a printer connected to computer 10 by a parallel cable). A camera 56 may also be provided for allowing the computer to receive a video signal via video input 54.

It will be appreciated that many variations are known to the skilled person regarding the workstation of FIG. 1. One possibility, for example, is for the workstation of FIG. 1 to be replaced by a so-called "network computer", which has no hard disk drive of its own, but rather downloads instructions across a network.

Figure 2:
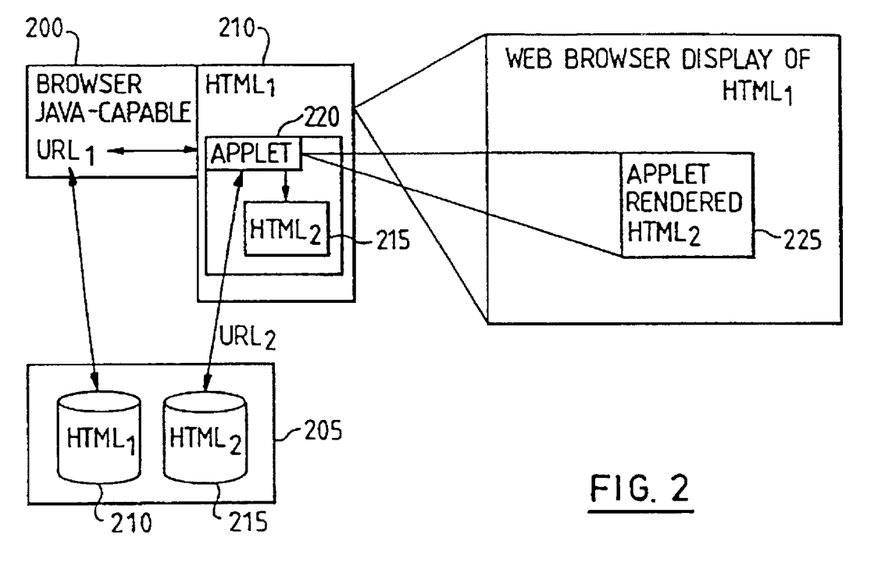
FIG. 2 illustrates schematically the operation of the present invention.

Referring now to FIG. 2, there is shown a web Browser 200 having Java capability, a so-called Java-capable browser, used to access html documents or web pages stored for example, on an Internet server 205 (alternatively the html documents may be stored on a server accessible via any other suitable network, such as an intranet, local area network, etc). The Java-capable web browser may be, for example, the HotJava web browser available from Sun MicroSystems. The Internet server 205 contains at least two HTML documents 210 and 215, both containing HTML instructions to be rendered to the screen of the computer system running the Java-capable browser. The first HTML document 210 contains a plurality of HTML instructions and includes an applet tag which causes a Java applet 220 to be downloaded and executed. The Java applet 220 is an HTML parser capable of parsing and rendering HTML instructions to the screen of the computer system upon which the browser is running. The creation of applets and their incorporation into HTML documents or web pages is well known within the art. Further information relating to applets can be found in, for example, "Teach Yourself Java in 21 Days" by L. Lemay and C. L. Perkins (published by SAMSNET, 201 West 103rd Street, Indianapolis, Ind., 46290). Typically, the applet tag has associated therewith a "param" tag which contains a URL of data to be rendered by the applet. The applet tag also contains "width" and "height" parameters which govern the size of the work space 225 within which an applet can draw or render data. In the present embodiment, the URL points to the second HTML document 215 to be rendered to the screen 42 of the computer system. When the applet is launched, the second HTML document 215 is obtained from the Internet server and the HTML instructions contained therein are rendered to the area of the screen reserved for used by the applet. The rendering by the applet within the respective reserved area of the screen and the actions performed by the applet are independent of the actions performed by the HTML instructions contained within the first HTML document 210. Therefore, using the Java HTML parsing and rendering applet, a HTML document can be embedded and rendered within another HTML document thereby allowing the creation of multi-layered or embedded HTML documents having at least two layers of HTML.

In a further embodiment of the present invention, the HTML parsing and rendering applet includes the capability to parse applet tags and associated tags and to launch applets accordingly. Therefore, further HTML documents can be embedded within the second HTML document by including therein an HTML parsing and rendering applet and a reference to yet another HTML file thereby adding a further level to the multi-level or embedded HTML document. As a consequence of nesting HTML parsers and renderers according to the above embodiment, multi-level or embedded HTML documents may be created and rendered comprising more than two levels of HTML. Each succeeding or embedded HTML document is realised by including an HTML parser and rendering applet within a preceeding HTML document.

The following HTML document illustrates a multi-levelled HTML document realised according to an embodiment of the present invention.

<html>
<head>
<title>EMBEDDED DOCUMENT EXAMPLE</title>
</head>
<body>
<applet codebase=http://bull.hursley.ibm.com/classes code=HTMLpart.class width=600 height=400>
<param name=dataURL value=http://bull.hursley.ibm.com/example1a.html>
</applet>
</body>

EXAMPLE 1

The HTML elements such as <html>, <head>, <title>, <body> and </body> are well understood by those familiar with HTML and will not be commented upon further. Within the applet tag, <applet . . . >, "code" is used to indicate the name of the class file that holds the applet which parses and renders HTML and "codebase" is used to identify the Internet server and directory which contains the class file containing the applet. Therefore, in the present example, the HTML parser applet would be located in the class called "HTMLpart.class" on Internet server "bull.hursley.ibm.com" in a directory called "classes". The "param" tag is used to pass parameters to applets as is well known within the art. Therefore an applet can receive inputs from the HTML document which contains the <applet> tag. The <param> tag comprises two elements, namely a name and a value which represent the name of the parameter to be passed to the applet and the value of the parameter passed to the applet respectively. It can be seen from the above example, that the parameter name is "dataURL" and the parameter value is "http://bull.hursley.ibm.com/example1a.html". The parameters are incorporated into the applet using the "getparameter" method as is well known within the art.

When the applet is executed the "HTMLpart" obtains the "dataURL" parameter using intrinsic Java capabilities and thereby obtains the contents of the file "example1a.html" from Internet server "bull.hursley.ibm.com". The file "example1a.html" is a file containing further HTML instructions. The file "examplea1.html" may contain, for example, the following HTML instructions:

<html>
<head>
<title>EMBEDDED HTML</title>
</head>
<body>
This section of text is embedded within the work space reserved for use by the applet reading, parsing and render this HTML document.
<applet codebase=http://bull.hursley.ibm.com/classes code=HTMLpart.class width=300 height=200>
<param name=dataURL value=http://bull.hursley.ibm.com/example1b.html>
</applet>
</body>

EXAMPLE 2

The HTML file "example1b.html" referred to above is processed by the applet HTMLpart.class, which parses and renders the HTML instructions shown below. The HTML instructions below render text and an accompanying image to the screen 42 of the computer system.

<html>
<head>
<title>Embedded text and image</title>
</head>
<body>
This section of text is related to the image rendered below
<img src="image.gif">
</body>

EXAMPLE 3

The applet tag in EXAMPLE 2 reserves, within the work space reserved for the first applet tag in EXAMPLE 1, a further work space for rendering the output of the second applet. Therefore, the first HTML document above in EXAMPLE 1 has embedded therein the HTML document shown in EXAMPLE 2 which, in turn, has embedded therein the HTML document shown in EXAMPLE 3 thereby producing a multi-levelled or embedded HTML document. Each level of HTML document can process and render data independently of the other levels of HTML. Therefore, compound documents can be constructed by having different data types processed and rendered by respective HTML documents (although of course the different HTML components do not necessarily contain different data types).

Figure 3:
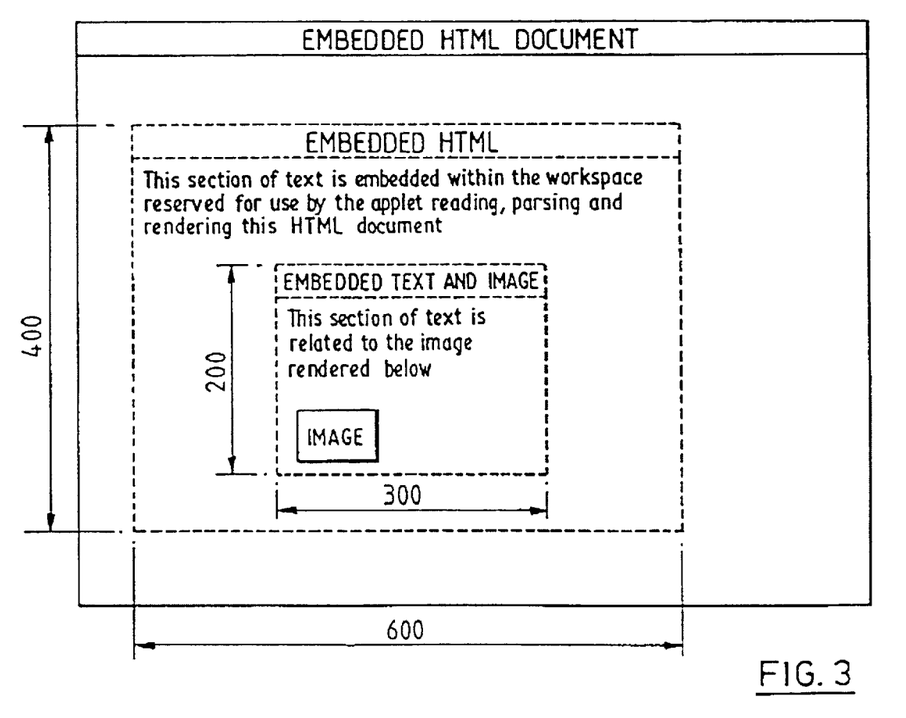
FIG. 3 depicts schematically a rendered multi-level or embedded HTML document.

Referring to FIG. 3 there is shown schematically the result of rendering the multi-levelled HTML document illustrated in Examples 1–3. The work space reserved for use by each applet has been depicted by a dotted line for the purpose of illustration only. Normally, the dotted lines would not be present, to allow seamless integration of one html document within another.

Figure 4A:
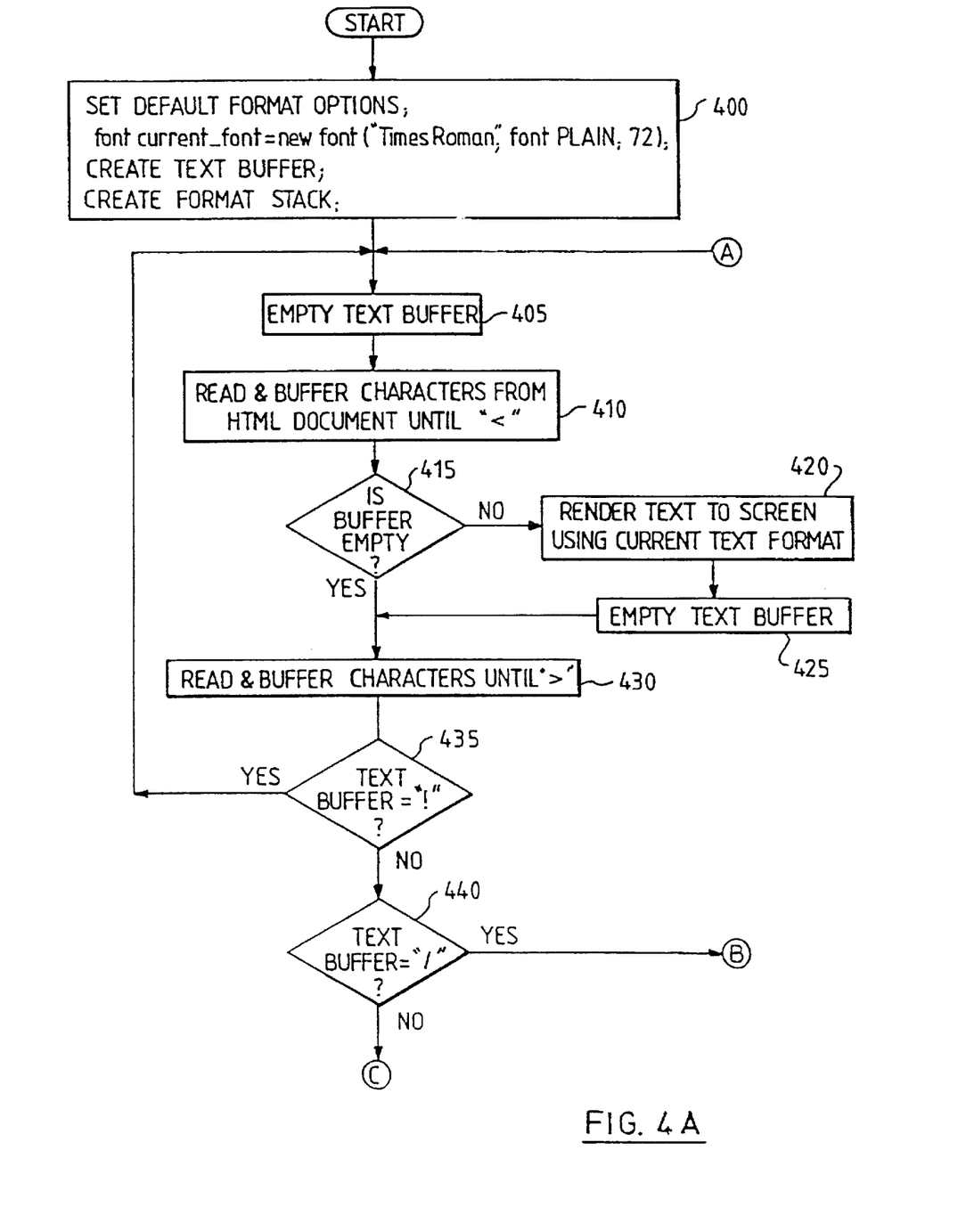
FIGS. 4A–4C show a schematic flow diagram of the Java applet parser and renderer.
Figure 4B:
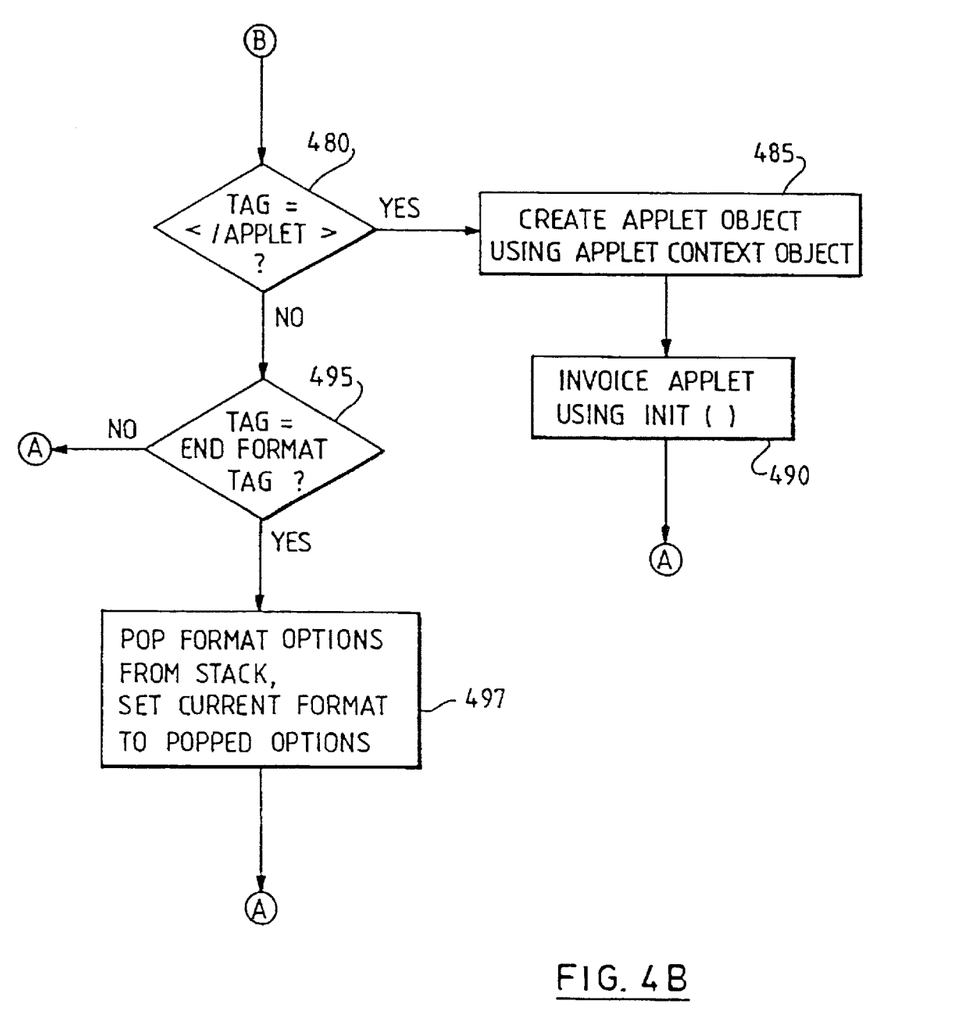
Figure 4C:
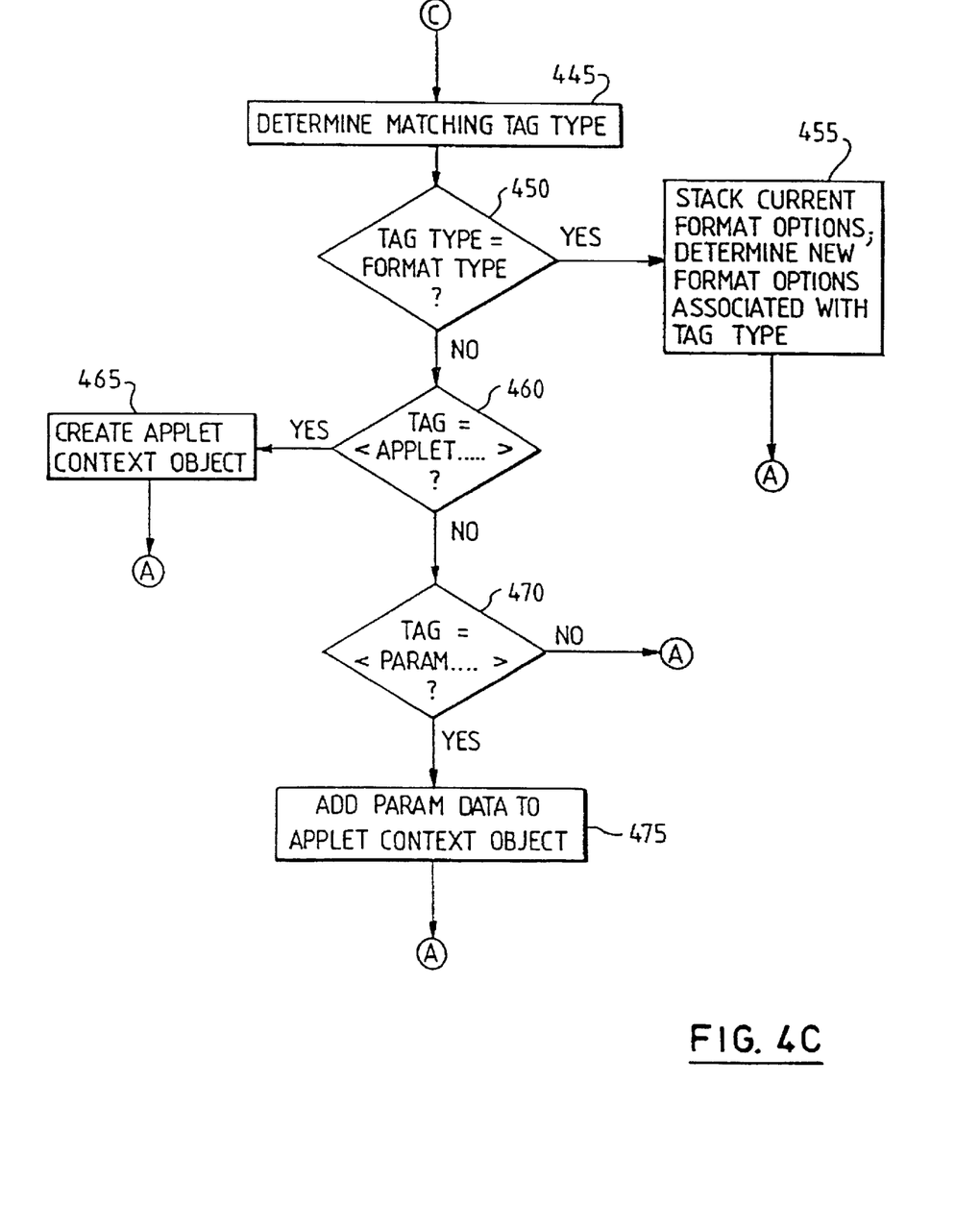

Referring to FIGS. 4A to 4C, there is shown a schematic flow diagram of the processing performed by the Java applet parser and renderer. At step 400 the default text format options are set and a text buffer and a format stack are created. The text format options govern the manner in which the text is subsequently displayed upon the screen of the computer. In the present embodiment, the text format options include font type, font size and font style. The text format options are stored in a data object and can take various values according to the capabilities of the computer executing the Java applet. The default options may be, for example, a font type of Times Roman, a font size of 10 and a font style of plain. The text buffer is used to store characters to be rendered to the screen of the computer system by the applet and the format stack is used to hold temporarily a plurality of text formats. The text data format object is used to store text format options on the text format stack.

The HTML document to be parsed and rendered by the applet is stored as a stream of contiguous characters. Hence the HTML instructions of, for example, EXAMPLE 3 would be stored as follows: <html><head><title>Embedded text and image</title></head><body>This section of text is related to the image rendered below <img src="image.gif"></body>.

The text buffer is emptied at step 405 in preparation for receiving characters to be rendered. The characters constituting the HTML are read from a given HTML file and stored in the text buffer at step 410 until a "<" character is encountered. The "<" character within HTML represents the beginning of a HTML tag as is well known within the art. A determination is made at step 415 as to whether or not the text buffer is empty. If the text buffer is not empty, the text currently stored therein is rendered to the screen using the standard Java libraries and the current format setting at step 420 and then the text buffer is cleared at step 425 in preparation for receiving further text to be rendered. If the text buffer is empty, further characters are read from the HTML document at step 430 until a ">" character is encountered.

A determination is made at step 435 as to whether or not the first character following the "<" is an exclamation character, "!". If so, the characters read from the HTML document since the last "<" character represent comments within the HTML document which are not intended to be rendered to the screen and control returns to step 405 whereupon the text buffer is cleared. If not, a determination is made at step 440 as to whether or not the next non-space character is a solidus thereby indicating that the tag represents an end tag.

Figure 5:
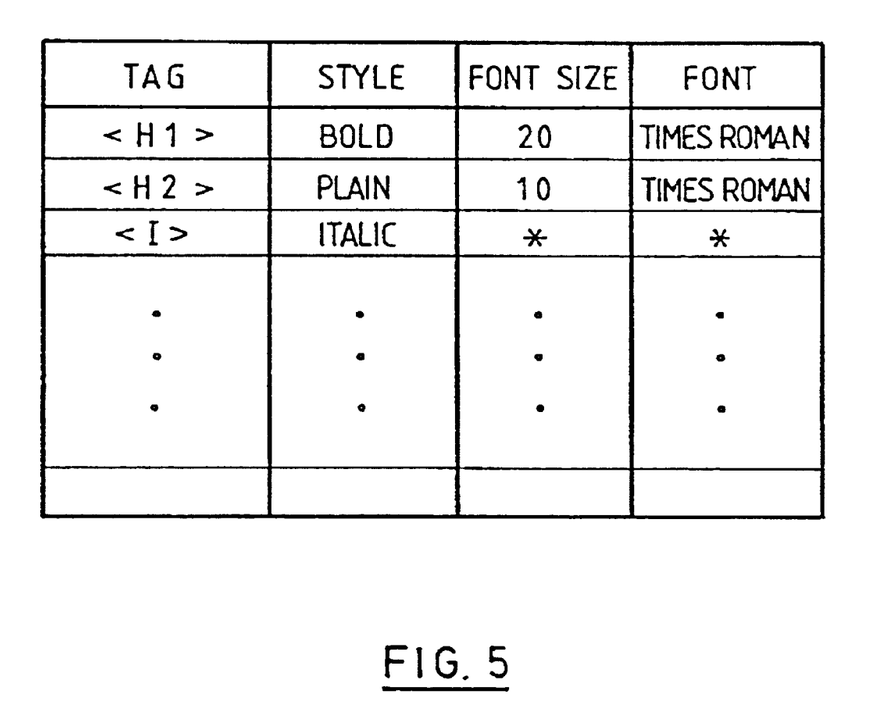
FIG. 5 shows a table for mapping HTML tags and corresponding formats.

If the next character is not a solidus, the characters stored within the text buffer must represent an HTML tag. A determination is made at step 445 as to the type of HTML tag represented by the characters read by the applet by comparing the characters stored in the text buffer with a plurality of stored characters representing known HTML tags. Once the type of HTML tag has been identified, a determination is made at step 450 as to whether or not the HTML tag is capable of influencing the format of the any subsequently displayed text. A format table of HTML tags capable of influencing the format of displayed text is stored within the memory of the computer. Referring to FIG. 5, the format table comprises a plurality of HTML tags which influence the format of displayed text together with a plurality of format values representing the style, font and font size associated with respective HTML tags. The characters representing the HTML tag are compared with each of the HTML tags stored within the format table until a match is located. Once a match is located, the current format parameters are pushed onto the format stack and the current format parameters are set to equal those determined from the format table as corresponding to the matching HTML tag at step 455. Having determined the appropriate format for any subsequently displayed text, control is passed back to step 405. Any subsequently rendered text will be output according to the determined format.

If the determination at step 450 is negative, it is established at step 460 whether or not the tag corresponds to an applet tag. If so, an applet context object is created at step 465. Processing is then continued from step 405.

If the HTML tag does not represent an applet, it is established, at step 470, whether or not the tag represents a param tag. If so, the parameter data for the applet is stored within the most recently created or an appropriate applet context object at step 475 in preparation for the invocation of the applet. If the tag does not represent a param tag, processing of the HTML document is again continued from step 405 (nb it is standard for HTML browsers to simply ignore any tags which they do not recognise).

If the determination made at step 440 is such that the next non-space character is a solidus, a further determination is made at step 480 as to whether or not the characters stored within the text buffer represent an applet end tag, that is to say, whether or not the characters stored within the text stack are "</applet>". If so, an applet object is created at step 485 using the parameter data previously stored in applet context object and the applet is invoked, at step 490, using the init( ) Java instruction as is well known within the art to instigate execution of the applet. Processing continues then from step 405.

If the determination is such that the characters stored within the text buffer do not represent an end applet tag, it is established, at step 495, whether or not those characters represent an end tag associated with a tag capable of influencing the formatting of the text. If so, the format parameters most recently placed onto the format stack are then pulled or popped from the stack thereby discarding the current format parameters and setting the current format parameters to those popped from the stack. Therefore, any subsequently rendered text will be displayed using the current format parameters. Processing then continues from step 405.

As described above, the format stack stores a plurality of formats detemined by from the various HTML tags which are capable of influencing the format of any subsequently output text. Each time a new HTML tag is encountered which is capable of influencing the format of subsequently output text, the current format parameters are pushed onto the stack and the current format parameters are set to equal those parameters which are associated with the new HTML tag. Therefore, any subsequently output text will have a format governed by the new format parameters. When the end tag associated with the above new HTML tag is encountered the current format parameters are discarded and the format parameters most recently placed upon the stack are retrieved. Therefore, any subsequently output text is formatted according to the format parameters retrieved from the stack.

For example, a level one heading may have nested therein italicized text as follows: <H1>Level one Heading<I> Italic text </I>Return to level one</H1>. Due to the operation of the applet parser, the format parameters associated with level one heading tag, <HI>, would be retrieved and the text "Level one Heading" would be output according to those parameters. However, when the applet encounters the italic tag, <I>, the current format parameters, that is, the level one heading format parameters, are pushed onto the stack and the the italic style is added to the current format parameters. Therefore, the subsequently rendered "Italic text" will be formatted according to the level one heading, but in italic style. When the end italic tag, </I>, is encountered, the current format parameters are discarded and the parameters most recently placed on the stack are retrieved. Therefore, the text "Return to level one" will be rendered according to the format parameters associated with the original level one heading tag.

Referring again to FIG. 5, it can be seen that the italic tag has associated therewith a font style of font.ITALICS while the remaining font types are represented by asterisks thereby indicating that the font name and size are wildcards. The effect of having such asterisks within a set of format parameters is that the values of the previous format parameter are retained for subsequent rendering of text. Therefore, the font name and font size of any subsequently rendered text remains the same as those for the previously rendered text. For example, assume that the <H1> tag has associated therewith the following set of format parameters, font.BOLD, 20, and TimesRoman and that the <I> tag has associated therewith format parameters of font.ITALIC, *, and *. Further, assume that the following HTML is to be rendered to the screen of the computer system: <H1>Text having <I> some italicised</I> text</H1>. The result of rendering the above text would be as follows:

Text having *some italicised* text

In the above flow chart the processing of repeated space characters is not expressly described. However, one skilled in the art would readily recognise that all but one of a plurality of contiguous space characters are ignored when rendering character or graphics to the screen.

It will be appreciated that the steps of rendering a first HTML document may be conducted substantially concurrently with the rendering of the second or an embedded HTML document. The respective documents may be processed using, for example, different threads within a multi-threaded operating system or environment for the execution of the applet performing the rendering and the parsing. However, an embodiment can be realised in which all of the instructions contained in a preceeding HTML document are parsed and rendered before the parsing and rendering of a succeeding or embedded HTML document is commenced. In such an embodiment the method steps of the present invention may be performed substantially sequentially.

I claim:

1. A method for rendering first and second html documents comprising respective first and second sets of html data to a display screen, wherein the first html document references the second html document, the method comprising the steps of:
    parsing and rendering the first set of html data to a first area of said screen, said first set of html data including an applet tag defining a second area of said screen in which to render said second html document, wherein said second area is embedded within said first area; wherein said applet tag further references a parsing and rendering applet for
    parsing and rendering to said second area of said screen the second set of html data substantially concurrent with rendering of said first html data.

2. A method as claimed in claim 1, further comprising the steps of creating a data structure for storing format data comprising a plurality of characteristics which determine the format of the rendering, said rendering being performed according to current format data, and wherein said steps of parsing and rendering further comprise the steps of:
    identifying new format data,
    storing a copy of said current format data in the data structure, and
    modifying the current format data according to the new format data.

3. A method as claimed in claim 2, further comprising the steps of
    identifying a need to change the current format data,
    recovering a copy of format data stored in the data structure, and
    modifying the current format data according to the recovered format data.

4. A method as claimed in claim 2, wherein the step of modifying comprises the steps of changing only selectable ones of said plurality of characteristics of the current format data according to the new format data thereby retaining selectable characteristics of stored format data.

5. A method as claimed in claim 3, wherein the step of modifying comprises the steps of changing only selectable ones of said plurality of characteristics of the current format data according to the new format data thereby retaining selectable characteristics of stored format data.

6. A system for rendering first and second html documents comprising respective first and second sets of html data to a display screen, wherein the first html document references the second html document, the system comprising:
    means for parsing and rendering the first set of html data to a first area of said screen, said first set of html data including an applet tag defining a second area of the screen in which to render said second html document, wherein said second area is embedded within said first area; and
    said applet tag further referencing an applet for parsing and rendering to said second area of said screen the second set of html data substantially concurrent with rendering of said first html data.

7. A system as claimed in claim 6, further comprising means for creating a data structure for storing format data comprising a plurality of characteristics which determine the format of the rendering, and wherein said means for rendering is responsive to current format data, and wherein said means for parsing and rendering further comprise
    means for identifying new format data,
    means for storing a copy of said current format data in the data structure, and
    means for modifying the current format data according to the new format data.

8. A system as claimed in claim 6, further comprising means for creating a data structure for storing format data comprising a plurality of characteristics which determine the format of the rendering, and wherein said means for rendering is responsive to current format data, and wherein said means for parsing and rendering further comprise
    means for identifying new format data,
    means for storing a copy of said current format data in the data structure, and
    means for modifying the current format data according to the new format data.

9. A system as claimed in claim 7, further comprising:
    means for identifying a need to change the current format data,
    means for recovering a copy of format data stored in the data structure, and
    means for modifying the current format data according to the recovered format data.

10. A system as claimed in claim 7, wherein the means for modifying comprises means for changing only selectable ones of said plurality of characteristics of the current format data according to the new format data thereby retaining selectable characteristics of stored format data.

11. A system as claimed in claim 9, wherein the means for modifying comprises means for changing only selectable ones of said plurality of characteristics of the current format data according to the new format data thereby retaining selectable characteristics of stored format data.

12. A computer program product on a computer readable medium comprising a multi-leveled document object comprising a first level of html data, and a second level of html data embedded within or accessible from said first level, said first level of html data including an applet tag containing a reference to an html parsing and rendering applet for receiving a reference to the second html document and parsing and rendering said second level of html data within a predeterminable area of said first level of html data for display on said screen substantially concurrent with rendering of said first html data.

13. A computer program product on a computer readable medium for rendering first and second html documents comprising first and second sets of html data to a display screen, wherein the first html document has embedded therein the second html document, comprising:

means for parsing and rendering the first set of html data to a first area of said screen, said first set of html data including an applet tag defining a second area of the screen in which to render said second html document, wherein said second area is embedded within said first area; and means responsive to said applet tag for parsing and rendering to said second area of said screen the second set of html data.

14. A computer program product as claimed in claim 13, further comprising means for executing Java instructions, wherein said first html document includes a Java applet tag containing a reference to a Java html parsing and rendering applet for parsing and rendering html to the screen, and wherein said means for reserving the second area is responsive to said Java applet tag, and said means for parsing and rendering said second set of html data comprises said Java applet.

15. A computer program product as claimed in claim 13, further comprising means for creating a data structure for storing format data comprising a plurality of characteristics which determine the format of the rendering, and wherein said means for rendering is responsive to current format data, and wherein said means for parsing and rendering further comprise:

means for identifying new format data, means for storing a copy of said current format data in the data structure, and means for modifying the current format data according to the new format data.

16. A computer program product as claimed in claim 14, further comprising means for creating a data structure for storing format-data comprising a plurality of characteristics which determine the format of the rendering, and wherein said means for rendering is responsive to current format data, and wherein said means for parsing and rendering further comprise:

means for identifying new format data, means for storing a copy of said current format data in the data structure, and means for modifying the current format data according to the new format data.

* * * * *